Sept. 7, 1948.	E. M. BARBER ET AL	2,448,950
INTERNAL-COMBUSTION ENGINE
AND METHOD OF OPERATING Filed Dec. 14, 1944	2 Sheets-Sheet 1

INVENTOR.
EVERETT M. BARBER
JAY B. MALIN
BY
ATTORNEY

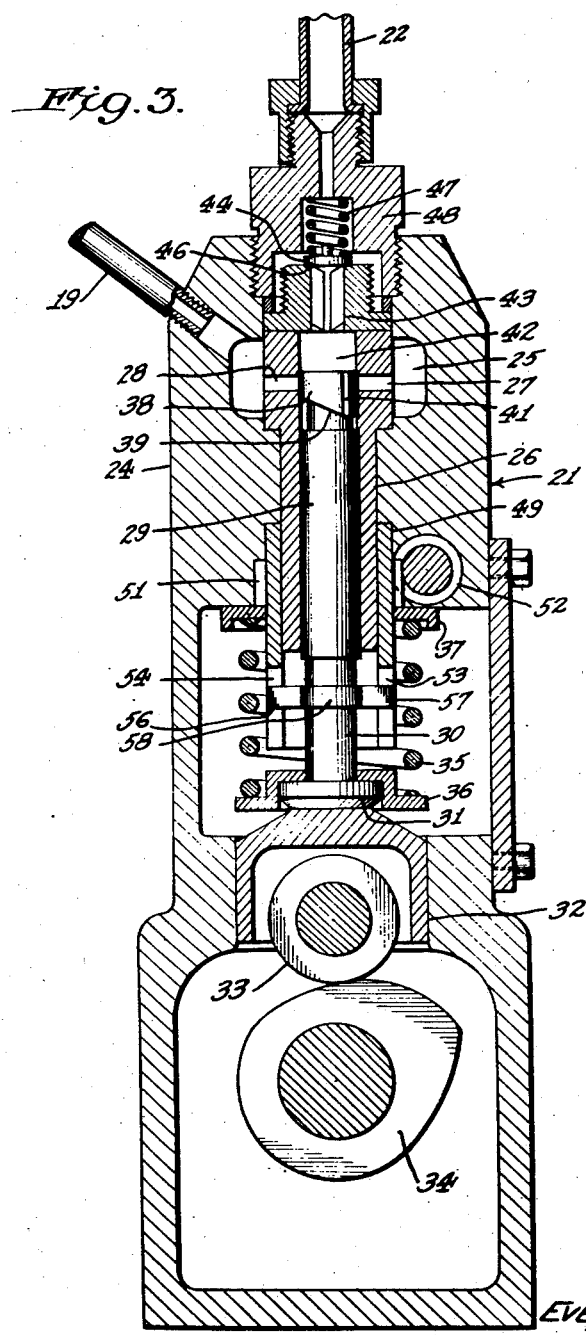

Patented Sept. 7, 1948

2,448,950

UNITED STATES PATENT OFFICE 2,448,950

INTERNAL-COMBUSTION ENGINE AND METHOD OF OPERATING

Everett M. Barber, Wappingers Falls, and Jay B. Malin, Fishkill, N. Y., assignors, by mesne assignments, to The Texas Company, New York, N. Y., a corporation of Delaware Application December 14, 1944, Serial No. 568,138

4 Claims. (Cl. 123—32)

1

This invention relates to internal combustion engines, and particularly to a method of carrying out combustion in an internal combustion engine wherein a fluid fuel is injected into air unmixed with sufficient fuel to support combustion (i. e., air itself or air mixed with insufficient fuel to support combustion) in the combustion chamber of an engine, the first-formed combustible mixture is spark ignited soon after formation to establish a flame front, and the later-formed combustible mixtures are caused to move into the flame front and are burned in a regular manner.

The invention relates especially to carrying out the method of operating an internal combustion engine disclosed in the application of Everett M. Barber, Serial No. 513,232, filed December 7, 1943, now abandoned, which is a continuation-in-part of application, Serial No. 463,031, filed October 23, 1942, now abandoned, in a manner such as to obtain maximum power per unit of fuel consumed. The invention, therefore, is applicable to the method of engine operation disclosed in the application of Jay B. Malin and W. N. Fenney, Serial No. 525,006, filed March 4, 1944, now Patent No. 2,412,821, dated December 17, 1946, and to the method disclosed in the application of Everett M. Barber, Serial No. 529,310, filed April 3, 1944, now abandoned.

Application Serial No. 513,232 discloses a method of engine operation comprising compressing air unmixed with sufficient fuel to support combustion in the combustion space of an internal combustion engine, injecting fuel into the compressed air within the combustion space at a temperature and pressure such that at least a portion of the fuel exists in vapor state and forms with a localized portion of compressed air a combustible fuel vapor-air mixture. The first-formed combustible mixture is immediately spark ignited before it has had an opportunity to be disseminated widely in the combustion space and a flame front is established. The injection of fuel is continued during the remainder of the period of injection in advance of the flame front and the fuel forms with the air additional localized combustible mixtures which are promptly ignited and burned. The formation of a substantial amount of highly heated end gases of combustible composition is avoided and, therefore, the possibility of spontaneous ignition and resulting knock is eliminated.

This method is preferably accomplished by providing for relative movement between the air and the locus or direction of fuel injection. Thus, in one embodiment the air is caused to

2 swirl in the combustion space during the compression stroke of the engine and the fuel is injected in the direction of air swirl beginning at a point near the top of piston travel, preferably from 75 to 15 degrees before top dead center. The first-formed combustible mixture is spark ignited substantially as soon as formed, just a few crank angle degrees after the start of injection, at a point located on the air downstream side of the point of injection. As a result, a flame front is established into which the combustible mixtures formed by the air and the following increments of injected fuel are caused to move and are burned in a regular manner.

The other applications referred to above involve features of operation making this general method applicable to particular engine arrangements. For example, application Serial No. 525,006, now Patent No. 2,412,821, discloses a method in which the fuel is injected against the direction of air swirl and the combustible mixtures formed are caused to move in the direction of a spark ignition means located at a point air downstream with respect to the location of formation of the combustible mixtures. Application Serial No. 529,310 discloses a method of operation in which the fuel is injected from the center of the combustion space radially across a body of swirling air and the resulting combustible mixtures are carried into contact with an igniting means located on the air downstream side of the direction of injection.

It is the principal object of the present invention to carry out a method of engine operation as discussed above in such manner as to obtain improved fuel economy or reduced specific fuel consumption per unit of power obtained.

Other objects of the invention will in part be obvious and will in part appear hereinafter.

In practicing the present invention, an engine is operated in accordance with the general method disclosed in the applications discussed above. While in discussing the invention reference will be made particularly to the method of operation disclosed in application Serial No. 513,232 involving the injection of fuel from the side of the engine cylinder in the direction of air swirl in the combustion chamber, it will be understood that the principles of the invention are equally applicable to the methods disclosed in the other applications discussed above.

We have discovered in accordance with the present invention that by controlling the injection of fuel to produce during a first part of the injection period localized combustible fuel vapor-air mixtures having a fuel-air ratio or ratios sufficiently high to make the mixtures easily spark ignitible, and then to produce during the remainder of the injection period fuel vapor-air mixtures which have a fuel-air ratio or ratios too low to make them spark ignitible but sufficiently high to make them combustible, maximum of fuel economy may be obtained from the engine.

We have discovered that the method of engine operation disclosed in the applications referred to above is adapted to take advantage of the following principles of fuel combustion. A good deal has been written concerning the lean limit of combustion of fuel-air mixtures in conventional spark ignition engines, and it has been stated that it is not feasible to operate a spark ignition engine using fuel vapor-air mixtures at a fuel-air ratio below about 0.035 or slightly higher, because this is the lean limit of combustion of such mixtures. This statement does not take into account the fact that in a conventional Otto cycle engine, the fuel vapor-air mixture is completely formed before ignition and therefore it is necessary that this mixture be spark ignitible as well as combustible. Accordingly, when the lean limit of combustion is discussed what is actually meant is the lean limit of spark ignition. It has been found that whereas the lean limit of spark ignition for fuel vapor-air mixtures is a fuel-air ratio of 0.035 or slightly higher, fuel vapor-air mixtures having much lower fuel-air ratios will burn in an already established flame.

The present method preferably comprises injecting a fluid fuel into a body of air in the engine cylinder over a period of time as previously described, but controlling the rate of injection so as to form during the first part of the period localized mixtures of fuel and air which are of spark ignitible composition. It is preferred to inject at such a rate as to form localized mixtures having fuel-air ratios of at least 0.06 since these mixtures are easily ignitible, but if desired the lean limit of spark ignition may be approached. These mixtures are ignited substantially as soon as formed, as described in the applications referred to, and a flame front is established. During the remainder of the injection period, the rate of fuel injection is adjusted so as to form localized incremental fuel-air mixtures having fuel-air ratios lower than the spark ignitible limit, for example, below 0.035, but above the combustible limit, for example, at least 0.01. These mixtures are caused to move into the already established flame front and are burned in regular manner. It will be understood, of course, that the change in the rate of fuel injection would not ordinarily be made suddenly, but rather that there would be a short period in which the mixtures of spark ignitible composition are formed, a brief period when the transition takes place and a longer period when mixtures of combustible but not spark ignitible composition are formed.

In forming the fuel-air mixtures in accordance with the invention the density of the air in the combustion chamber of the engine is taken into account. The fuel is sprayed into the chamber in a selected spray form and should occupy a definite space at the instant after injection and at the time of ignition or burning. The fuel-air ratio of the incremental mixture formed at any instant of injection, therefore, is dependent upon the rate of fuel injection and also upon the density of the air occupying the space into which the fuel is sprayed. Since at least the bulk of the fuel is preferably injected before top dead center of piston travel, and the injection takes place over a number of crank angle degrees, it will be seen that as the injection proceeds the fuel is sprayed into air of increasing density. This increase in density is caused principally by the pressure increase due to the motion of the piston and the pressure increase due to combustion. Accordingly, the rate of injection is adjusted to take account of this factor and thereby accurately form fuel-air mixtures of previously determined composition.

The period in crank angle degrees during which the injection of fuel takes place may be varied. Since the present method is designed to operate the engine with maximum economy rather than maximum power, it is not essential that all of the air in the combustion chamber of the engine be impregnated with fuel, even to produce lean mixtures. However, when it is desired to obtain the full amount of power obtainable from the engine when employing controlled injection as described, it is preferable to control the period of injection so as to impregnate substantially all of the air in the combustion chamber with fuel. To accomplish this the period of injection should be correlated with the rate of air swirl so that the fuel is injected during the time required for one rotation of the body of air in the combustion chamber.

By proceeding in accordance with the invention it is possible to take maximum advantage of the fact that lean mixtures produce on burning more power per unit weight of fuel than rich mixtures. Because the flame front is established by igniting and burning the first-formed relatively rich mixtures, extremely lean mixtures may be burned during a substantial part of the combustion period.

In order that the invention may be understood more fully, reference should be had to the accompanying drawing in which Figure 1 is a diagrammatic illustration of an engine cylinder with appurtenances including the fuel injection system;

Figure 3 is a vertical sectional view of a fuel pump adapted to supply fuel at a controlled rate.

Figure 1:
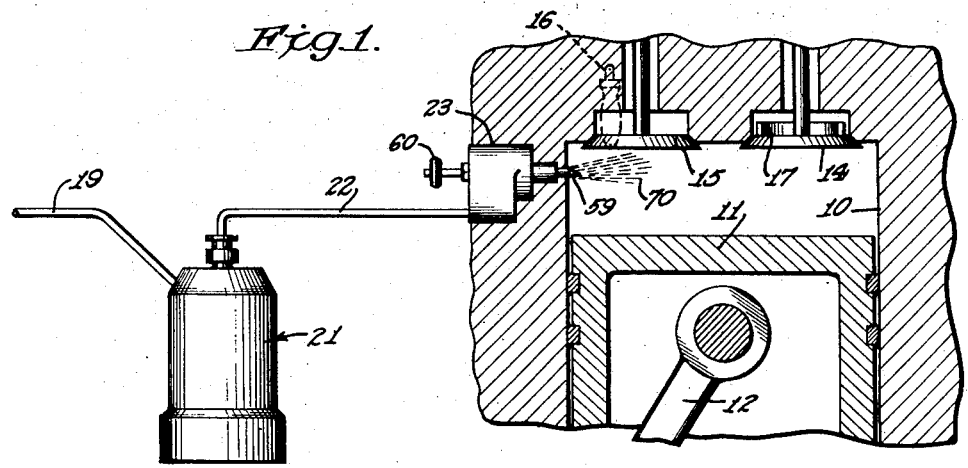
Figure 2:
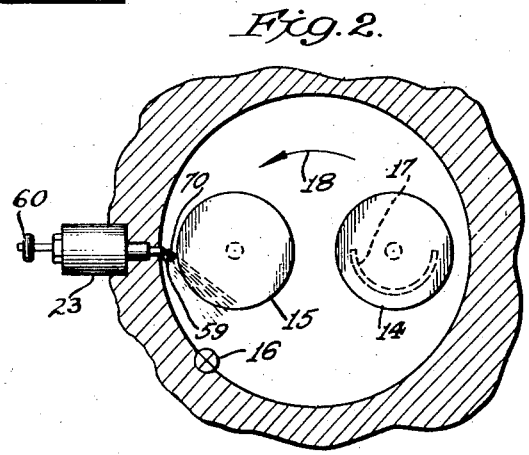
Figure 2 is a horizontal view looking upward in the cylinder of Figure 1, illustrating the location of the valves and fuel nozzle and the type of combustion in the combustion space.

Referring to Figures 1 and 2, the engine cylinder is indicated at 10 with piston 11 and connecting rod 12 which runs to the usual crank shaft, not shown. The cylinder head is equipped with suitable ports controlled by an intake valve 14 and an exhaust valve 15, and an opening receiving a spark plug 16 connected to a conventional ignition system, not shown. Communicating with the intake valve 14 is a conventional air intake pipe or manifold which may contain a suitable muffler, also not shown. The intake valve 14 is equipped with a shroud 17 which is effective to cause the entering air to swirl in planes which are generally at right angles to the axis of the cylinder. The direction of air swirl is as indicated by the arrow 18 in Figure 2.

The fuel employed in operating the engine enters through pipe 19 from any suitable storage vessel, not shown, and enters pump 21. This pump may be of the type illustrated in Figure 3 and described more fully hereinafter, which is adapted to supply fuel at a controlled pressure or rate through line 22 to a suitable injector represented generally at 23.

Referring to Figure 3, the fuel, which may be liquid fuel such as gasoline or kerosene, enters through conduit 19 which has threaded engagement with body 24 of pump 21 and enters a fuel gallery 25. The gallery surrounds the upper portion of a pump barrel 26 which is disposed in a longitudinal cavity in the pump body. Ports 27 and 28 provide means for conducting fluid from the gallery to the cavity of the barrel 26. A plunger 29 is slidably and rotatably disposed in the barrel. The plunger includes a lower section 30 of reduced diameter and has an enlarged lower end 31 in contact with a cam tappet 32 carrying a cam follower 33. The cam follower is in contact with a cam 34 having a profile designed to produce controlled fuel injection as described below. The lower portion of the plunger is held in engagement with the tappet by means of a plunger spring 35 having retainers 36 and 37. The upper portion of the plunger is provided with a control section 38 terminated by a helix 39. This control section has a passage or slot 41 leading from the bottom of the helix to a portion of the barrel cavity forming a fuel supply chamber 42. This chamber communicates with a passage 43 controlled by a check valve 44 which is held on a seat 46 with a selected force by means of a spring 47 disposed in the check valve body 48. Fluid passing through passage 43 leaves the pump through line 22 leading to the injector 23.

In order to provide for rotation of the pump plunger, there is slidably disposed about the pump barrel a sleeve 49 having gear teeth 51. These teeth are in engagement with a rack gear 52 which is caused to move by means, not shown, controlled by the accelerator of the engine. At its lower end the sleeve 49 is slotted as shown at 53 and 54. These slots receive extensions or ears 56 and 57 of a yoke 58 which is rigidly attached to the lower portion 30 of the plunger 29. It will be seen that rotation of the sleeve 49 by the worm gear 52 will cause rotation of the plunger 29. The purpose of this rotation is to adjust the position of the control section 38 of the plunger and thereby vary the amount of fuel supplied by the pump.

The operation of the pump will be readily understood by those skilled in the art since pumps of this general type have been employed for some time. The fuel under low pressure is continuously supplied to the fuel gallery 25. On the suction stroke of the plunger the fuel flows from the gallery through ports 27 and 28 into fuel delivery chamber 42. On the delivery stroke the plunger is moved upward by the rotation of the cam 34 to compress the fuel and when the force exerted by the fuel reaches a selected value, check valve 44 is opened and the fuel flows through line 22 at a controlled, variable rate. The rate is determined by the profile of the cam and the other characteristics of the pump and may be changed by changing the profile of the cam. The amount of fuel delivered on each stroke of the pump is determined by adjustment of the control section 38 of the plunger by rotation, by means of rack gear 52, sleeve 49, and ears 56 and 57 of yoke 58. Thus, as the plunger moves upward, at a selected point, depending upon the rotative position of the plunger, the port 28 will be opened to the space below the helix 39. Since the pressure on the fuel in the gallery 25 will be relatively low, fuel in this space will flow out of the port. Also, since this space is conncted with the fuel delivery chamber 42 by means of the channel 41, the instant the port is uncovered on the delivery stroke the pressure on the fuel in the delivery chamber is immediately reduced and check valve 44 is closed. During the remainder of the delivery stroke, therefore, no fuel is pumped to the engine and excess fuel is pumped back into the line 19.

The injector, indicated generally at 23, may be of the conventional type comprising a nozzle, a nozzle pintle normally closing the nozzle opening and a resilient means such as a spring for holding the nozzle pintle in the closed position with some selected force. In injectors of this type the fuel is usually caused to flow to a pressure chamber surrounding a conical inner end of the nozzle pintle and the pressure on the fluid acting against the conical surface is sufficient to raise the pintle and permit the fuel to enter the chamber in spray form. In Figures 1 and 2, the extension or tip of the nozzle is shown at 59 and a wheel for regulating the compression of the spring holding the nozzle pintle in position is shown at 60.

Figure 4:
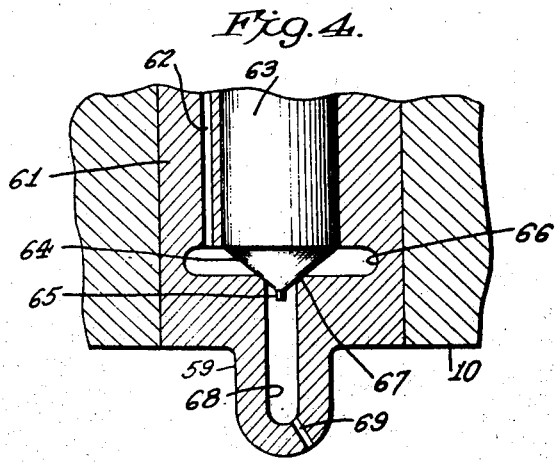
Figure 4 is a detailed sectional view of the inner end of a fuel nozzle adapted for use in practicing the present invention.

Figure 4 discloses the inner end of a suitable injector, the portion disclosed being generally termed the nozzle portion of the injector. There is shown a nozzle body portion 61 having a fuel conduit 62. Disposed in a cylindrical section of the body portion is the nozzle pintle 63, which as explained above, is yieldingly held in position with a selected force exerted by means of a spring acting against its outer end. The nozzle pintle has a conical inner end 64 and a pintle tip 65. The body portion 61 has a fuel chamber 66 which forms a connection between the fuel conduit and the nozzle opening and also comprises a pressure chamber.

As shown, the conical inner end of the pintle is seated on a frusto-conical seat 67 provided in the nozzle body portion between the pressure chamber and the channel 68 of the nozzle tip 59. It will be noted that in operation the fuel under the desired pressure enters the conduit 62 and flows into the pressure chamber where, if the pressure on the fuel is sufficient, the nozzle pintle is lifted from the seat 67, permitting the fuel to flow into the channel 68. From the channel 68 the fuel issues from the nozzle tip in the form of a finely-dispersed spray through the opening 69. In the type of nozzle shown, the direction of fuel injection is determined by the placing of the opening 69.

When operating in accordance with the invention using the engine and fuel system shown in the drawings, the pump and the injector are constructed and adjusted relative to one another so as to accomplish the controlled, variable injection rate desired. Thus, the force holding the pintle of the injector in position should be adjusted relative to the pressure at which the fuel is supplied to the injector by the pump, and the profile of the cam is designed to force the fuel from the pump at the selected variable rate desired. While the cam profile shown is of the general design required, it will be understood that the exact profile will depend upon the factors discussed above.

The operation of the engine is as follows: On the suction stroke of the piston, air is brought into the cylinder through intake valve 14 and is caused to swirl about the axis of the cylinder by means of shroud 17 as previously described. On the compression stroke of the piston the air is compressed while the swirl is continued. At a selected point near the top of piston travel, for example, 75 to 15 crank angle degrees before top dead center, the injection of fuel is begun at a rate so as to impregnate a localized volume of the swirling air with sufficient fuel to produce an incremental combustible mixture having a fuel-air ratio of at least 0.06, this mixture therefore being of spark ignitible composition. This is accomplished by correlation of the pump cam profile and injector characteristics as previously explained. Thus, the fuel flows to the injector 23 at a selected pressure and enters conduit 62 leading to pressure chamber 66. The pressure on the fuel is sufficient to raise the nozzle pintle 63 a selected amount to permit the flow of fuel at the desired rate from the pressure chamber through channel 68 of nozzle tip 59 and thence through opening 69 to the combustion chamber. It will be noted that the rate of flow from the pressure chamber to the combustion chamber of the engine is directly proportional to the difference between the pressure in the pressure chamber and the pressure in the combustion chamber and the area of the fuel orifice which may be varied by controlling the distance that the nozzle pintle is permitted to lift from its seat, which in turn is governed by the rate of displacement of pump plunger 29.

The fuel is sprayed into the combustion chamber in the direction shown by the spray form 70, Figures 1 and 2 under temperature and pressure conditions such that at least a portion thereof exists in vapor state. The first increment of fuel mixes with a localized volume of swirling air to form a localized combustible and spark ignitible fuel vapor-air mixture having a fuel-air ratio of at least 0.06 within a very short travel from the point of injection. Substantially as soon as this first combustible mixture is formed, it is brought in contact with the electrodes of the spark plug, and is ignited. With the arrangement shown and utilizing a cylinder of about 3¼ inches in internal diameter, the ignition should take place within 5 to 10 crank angle degrees after the beginning of injection. This results in the establishment of a flame front tending to advance in the direction of fuel injection although probably remaining substantially stationary in relation to the cylinder wall due to the action of the swirling air.

The injection of fuel at a rate sufficient to produce combustible mixtures of spark ignitible composition may be continued for 5 to 10 crank angle degrees so as to produce a well-established flame front. Thereafter the rate of injection is lowered by the action of the pump to reduce the rate of fuel injection and produce in the combustion chamber fuel vapor-air mixtures of combustible but not spark ignitible composition. These later-formed combustible mixtures will move into the already established flame front and will burn efficiently.

As stated previously, the period of injection may be varied but it is preferred to employ an injection period varying from about 30 to 70 crank angle degrees for full load operation. This is accomplished in the first instance by the action of the pump, the setting of the control section or helix of the pump determining the amount of fuel supplied, as previously explained. During most of the injection period, therefore, the fuel is injected at a rate to produce combustible mixtures of low fuel-air ratio. When the selected period of injection has been completed (i. e., when the desired amount of fuel has ben injected), the flow of fuel to the injection nozzle is shut off sharply. The release of pressure on the fuel causes the spring to slam the nozzle pintle against its seat and the flow of fuel into the combustion chamber is ended.

While engine operation in which the injection of fuel is begun only a few degrees before top dead center or even after this point, and operation in which the period of injection extends past this point or even if begun substantially before are included within the scope of the invention, it is preferred to begin fuel injection substantially before top dead center.

The fuel-air ratio that has previously been discussed is, of course, not the same as the fuel-air ratio commonly referred to, since the latter expresses the ratio between the total amount of fuel introduced and the total amount of air present in the combustion chamber. The present invention is concerned with the fuel-air ratio existing in the localized incremental volumes of air in the combustion chamber into which the spray of fuel is directed.

Aside from the factors specifically considered, the present invention is practiced as described in the applications previously referred to and therefore discussion of other phases of this type of engine operation, such as the relative placing of the fuel nozzle and ignition means, and the relative timing of fuel injection and ignition is thought to be unnecessary for proper understanding of the invention. It is sufficient to note that the ignition means should be located with respect to the injector such that the first-formed combustible mixture may be ignited substantially as soon as formed. This means, therefore, that a spark of igniting intensity should be present at the spark plug at the time the first-formed combustible mixture reaches the spark plug. Inasmuch as conventional ignition systems have been found to produce a spark of igniting intensity which persists for a substantial number of crank angle degrees, in some cases of the order of 5 to 30 crank angle degrees, the synchronization between injection advance and spark advance is not difficult to attain provided the proper relative location of the point of injection and ignition means has been selected.

As pointed out in the applications referred to, the method of operation with which the invention is concerned removes the restrictions imposed by combustion detonation or knock and therefore the fuel used may be any suitable fluid fuel of low or high octane, and may be liquid or gaseous at standard conditions. Examples of suitable fuels are gasoline, kerosine, and fuel oils.

Obviously many modifications and variations of the invention, as hereinbefore set forth, may be made without departing from the spirit and scope thereof, and therefore only such limitations should be imposed as are indicated in the appended claims.

We claim:

1. In the operation of an internal combustion engine, wherein air containing insufficient fuel to support combustion is introduced into the cylinder combustion space and compressed therein, fuel is injected into a localized portion of the compressed air, the combustible fuel vapor-air mixture produced from said first increment of injected fuel is spark ignited substantially as soon as formed to establish a flame front, and the injection of fuel is continued after ignition while the locus of fuel injection and the compressed air are moved relatively to each other in an orderly manner during the period of fuel injection to thereby progressively impregnate with fuel fresh localized portions of the compressed air to form additional quantities of combustible fuel vapor-air mixture which are ignited by the flame and burned substantially as soon as formed, the improvement which comprises initiating injection of fuel on each cycle at a rate to impregnate the first increments of air with fuel at fuel-air ratios above the spark ignitible limit to provide for easy ignition of the first increment of injected fuel and the establishment of a flame front, and then decreasing the rate of fuel injection to impregnate succeeding increments of the air at fuel-air ratios below the spark ignitible limit but above the combustible limit, to thereby obtain improved fuel economy.

2. The method according to claim 1, wherein the rate of fuel injection is controlled to form during the first part of the injection period localized fuel vapor-air mixtures having a fuel-air ratio of at least 0.06, and to form during most of the remainder of the injection period localized fuel vapor-air mixtures having a fuel-air ratio below 0.035 and above 0.01.

3. In the operation of an internal combustion engine, wherein air is introduced into the cylinder combustion space in a manner to impart a high velocity swirling movement therein, said air is compressed within the combustion space while maintaining the swirling movement, the injection of fuel is initiated into a localized portion of the compressed swirling air toward the latter part of the compression stroke, the combustible fuel vapor-air mixture produced from the first increment of injected fuel is spark ignited substantially as soon as formed to establish a flame front, and the injection of fuel is continued after ignition for a substantial period to thereby progressively impregnate with fuel fresh localized portions of the compressed swirling air to form additional quantities of combustible fuel vapor-air mixture which are ignited by the flame and burned substantially as rapidly as formed, the improvement which comprises initiating injection of fuel on each cycle at a rate to impregnate the first increments of air with fuel at fuel-air ratios above the spark ignitible limit to provide for easy ignition of the first increment of injected fuel and the establishment of a flame front, and then decreasing the rate of fuel injection to impregnate succeeding increments of the air at fuel-air ratios below the spark ignitible limit but above the combustible limit, to thereby obtain improved fuel economy.

4. In an internal combustion engine of the character described comprising a cylinder and a piston therein providing a combustion space, means for introducing air into said combustion space for compression therein on the compression stroke of said piston, fuel injection means for injecting fuel into said compressed air, spark ignition means having electrodes located in said combustion space with respect to said fuel injection means to ignite the combustible fuel vapor-air mixture formed from the first increment of injected fuel substantially as soon as produced to establish a flame front, means for controlling the duration of injection so that injection continues for a substantial period after ignition, and means for moving the locus of fuel injection and compressed air relatively to each other in an orderly manner during the period of fuel injection to thereby impregnate progressively fresh increments of the compressed air to form additional quantities of combustible fuel vapor-air mixture which are ignited by the flame and burned substantially as soon as formed; the improvement comprising control means for the rate of fuel injection to vary said rate during the fuel injection period, said control means having provisions for initiating fuel injection at a higher rate to impregnate the first increments of air with fuel at fuel-air ratios above the spark ignitible limit, and then decreasing the fuel injection rate to impregnate succeeding increments of the air at fuel-air ratios below the spark ignitible limit but above the combustible limit.

EVERETT M. BARBER.
JAY B. MALIN.

REFERENCES CITED

The following references are of record in the file of this patent:

UNITED STATES PATENTS

| Number | Name | Date |
| --- | --- | --- |
| 2,306,364 | Skaredoff | Dec. 22, 1942 |
| 2,315,907 | Starr | Apr. 6, 1943 |

FOREIGN PATENTS

| Number | Country | Date |
| --- | --- | --- |
| 600,008 | France | Jan. 28, 1926 |